(12) United States Patent
Marshall, III

(10) Patent No.: US 10,932,436 B2
(45) Date of Patent: Mar. 2, 2021

(54) AIR FILTRATION AND CONTROL SYSTEM FOR AN ANIMAL HOUSING

(71) Applicant: Henry Bennie Marshall, III, Pawleys Island, SC (US)

(72) Inventor: Henry Bennie Marshall, III, Pawleys Island, SC (US)

(*) Notice: Subject to any disclaimer, the term of this patent is extended or adjusted under 35 U.S.C. 154(b) by 478 days.

(21) Appl. No.: 16/042,825

(22) Filed: Jul. 23, 2018

(65) Prior Publication Data

US 2019/0021272 A1    Jan. 24, 2019

Related U.S. Application Data

(60) Provisional application No. 62/536,159, filed on Jul. 24, 2017.

(51) Int. Cl.

| A01K 1/00 | (2006.01) |
| A01K 13/00 | (2006.01) |
| A01K 1/03 | (2006.01) |
| F24F 11/00 | (2018.01) |
| F24F 3/16 | (2021.01) |
| F24F 13/08 | (2006.01) |

(52) U.S. Cl.
CPC ............ *A01K 1/0047* (2013.01); *A01K 1/033* (2013.01); *F24F 3/1603* (2013.01); *F24F 11/0001* (2013.01); *F24F 13/085* (2013.01); *F24F 2011/0005* (2013.01)

(58) Field of Classification Search
CPC .... A01K 13/001; A01K 13/00; A01K 1/0047; A01K 1/0052; F24F 3/1603; F24F 11/0001; F24F 2011/0005; B08B 5/04
USPC ............... 119/448, 165, 452, 473; 55/467
See application file for complete search history.

(56) References Cited

U.S. PATENT DOCUMENTS

| 3,101,488 | A | 8/1963 | Peebles | |
| 5,264,015 | A * | 11/1993 | Matsui | F24F 3/1603 |
| | | | | 55/467 |
| 5,477,810 | A * | 12/1995 | Wilkison, III | A01K 1/031 |
| | | | | 119/459 |
| 5,662,069 | A | 9/1997 | Smith | |
| 6,237,531 | B1 | 5/2001 | Peeples | |
| 6,553,935 | B1 | 4/2003 | Penner | |
| 6,698,384 | B2 * | 3/2004 | Markowitz | A01K 1/0107 |
| | | | | 119/165 |

(Continued)

FOREIGN PATENT DOCUMENTS

EP    2260698 A2    12/2010

*Primary Examiner* — Yvonne R Abbott-Lewis
(74) *Attorney, Agent, or Firm* — Kim and Lahey Law Firm, LLC; Seann P. Lahey

(57) ABSTRACT

A base carrying a left-side panel and a right-side panel. A top panel is disposed on and extends between said side panels, wherein said base, said side panels and top panel define a pet receiving area. A blower unit disposed at a rear side of said pet receiving area drawing air in a direction from a front side to said rear side of the housing across the pet receiving area. An airflow control covering disposed on at least one of said left-side panel and said right-side panel providing a reduced airflow entering said pet receiving area through the side panel relative to a front side of the housing, wherein a negative air pressure is established within the housing while providing a primary airflow direction from said front side to said rear side of the housing to container pet hair, dander and debris within said housing.

20 Claims, 11 Drawing Sheets

(56) References Cited

U.S. PATENT DOCUMENTS

| | | |
|---|---|---|
| 7,011,046 B1 | 3/2006 | Kidwell |
| 7,185,604 B2 | 3/2007 | Holte |
| 7,240,386 B1 | 7/2007 | McKay |
| 9,451,758 B2 * | 9/2016 | Kaneda ................ A01K 13/001 |
| 9,756,952 B2 | 9/2017 | Alletto |
| 10,426,139 B1 * | 10/2019 | Hill ..................... A01K 13/001 |
| 2014/0349564 A1 * | 11/2014 | Lamothe .................. F24F 9/00 |
| | | 454/188 |
| 2016/0061481 A1 | 3/2016 | Wolfe |

* cited by examiner

AIR FILTRATION AND CONTROL SYSTEM FOR AN ANIMAL HOUSING

BACKGROUND OF THE INVENTION

1) Field of the Invention

The present invention relates to an air filtration and control system for use in an animal housing or independently to contain debris by maintaining a negative air pressure within the housing and/or drawing air around the animal into an air filtration system to resist pet hair, dander and other debris from exiting the housing or escaping the area in which the system is operating.

2) Description of Related Art

Pet hair and dander can be a constant nuisance for pet owners. Even when the animal is confined, the hair and dander is easily spread through a house by airflow within the house.

Animal housings known in the prior art fail to address the needs of pet owners, particularly dog owners, to control pet hair and dander. Most animal housing available for pet owners are focused on cooling the pet by blowing air into the housing or pet bed. This creates a positive air pressure situation that causes pet hair, dander and other debris to be tossed into the air and easily spread throughout the home.

Some housings, particularly for cats, include air filtration systems that simple draw air into a closed box type housing, typically when the animal is not present to avoid scaring the animal with fan noise. These systems fail to contain the hair and dander while the animal is spending time in the housing where it can best be contained. Additionally, the air is either drawn upwardly through a vent or downwardly through a floor opening. As such, fresh air is not drawn across the animal and completely through the housing, limiting the effectiveness of such systems to cool the animal and contain pet hair and dander.

Additionally, debris that is too large to be drawn into an air filter, such as small rocks, sand and dirt on dog paws, can collect on the bedding surface where it is ultimately tracked back into the home.

Accordingly, it is an object of the present invention to provide an air filtration and control system for use in an animal housing that maintains a constant negative air pressure to control pet hair and dander from exiting the animal housing.

It is a further object of the present invention to provide an air filtration system and control system that can operate at low noise levels to avoid scaring the animal while in the housing.

It is a further object of the present invention to provide an animal housing able to capture and separate debris from the animal that is too large to be drawn into the air filtration system.

It is a further object of the present invention to provide an air filtration and control system for use in an animal housing that allows airflow from the sides, top and bottom of the housing, while controlling the airflow so that it primarily draws air horizontally through the housing to help cool the animal and draw hair and dander into the air filter.

It is a further object of the present invention to provide an air filtration and control system that can provide a bedding independent of a housing while controlling the airflow around the bedding to help contain pet air and dander.

SUMMARY OF THE INVENTION

The above objectives are accomplished according to the present invention by providing an air filtration and control system for an animal housing comprising a base carrying a left-side panel and a right-side panel; a top panel disposed on and extending between said side panels, wherein said base, said side panels and top panel define a pet receiving area; a blower unit disposed at a rear side of said pet receiving area drawing air in a direction from a front side to said rear side of the housing across the pet receiving area; and, an airflow control covering disposed on at least one of said left-side panel and said right-side panel providing a reduced airflow entering said pet receiving area through the side panel relative to a front side of the housing, wherein a negative air pressure is established within the housing while providing a primary airflow direction from said front side to said rear side of the housing to container pet hair, dander and debris within said housing.

In a further advantageous embodiment, a bedding unit is disposed in said pet receiving area adapted to receive and channel air from said blower unit at said rear of said housing back toward said front side of said housing wherein said air is exhausted and directed back toward said blower unit underneath said bedding unit.

In a further advantageous embodiment, said bedding unit includes a frame having an interior air channel adapted for engaging in fluid communication with a plenum chamber of said blower unit for channeling air from said blower unit through said frame.

In a further advantageous embodiment, said frame includes at least one front exhaust port disposed in a front cross frame member disposed at a far end of said bedding unit away from said blower unit for directing airflow back toward said blower unit.

In a further advantageous embodiment, said frame includes at least one exhaust port disposed in a left cross frame member and a right cross frame member for exhausting air underneath said bedding unit.

In a further advantageous embodiment, a mesh sheet is carried by said frame and suspended over said base to define an animal receiving surface, wherein said mesh sheet allows for vertical airflow through said bedding unit.

In a further advantageous embodiment, at least one debris collection gap is disposed between said bedding unit and at least one of said left-side panel and said right-side panel.

In a further advantageous embodiment, a tray is disposed beneath said bedding unit and said debris collection gap for receiving debris that falls through said debris collection gap.

In a further advantageous embodiment, said tray includes at least one adhesive strip for trapping debris in said tray.

In a further advantageous embodiment, said airflow control covering comprises a mesh sheet disposed over at least a portion of one of said left-side panel and said right-side panel.

In a further advantageous embodiment, a grate is disposed on an interior side of at least one of said left-side panel and said right-side panel.

In a further advantageous embodiment, a front door panel is pivotally mounted to one of said left-side panel and said right-side panel, wherein said front door panel comprises a grate providing generally unrestricted airflow through said front door panel relative to said airflow control covering disposed on at least one of said left-side panel and said right-side panel.

In a further advantageous embodiment, said blower unit includes an air filter disposed between a fan and said pet receiving area for filtering air being drawn through the housing.

In a further advantageous embodiment, said airflow control covering includes a cover frame removably carried in a lower channel in said base and in an upper channel in said top panel, wherein removal of said top panel allows said cover frame to be raised out of said lower channel for removing said airflow control covering.

In a further advantageous embodiment, an upper air channel is carried by said top panel, wherein said upper air channel is adapted for engaging in fluid communication with said plenum chamber of said blower unit for channeling air from said blower unit through said upper air channel, and wherein said upper air channel includes at least one exhaust port for blowing air into said pet receiving area.

In a further advantageous embodiment, a control valve is operatively associated with said upper air channel for selectively allowing air to enter said upper air channel from said plenum chamber.

The above objectives are further accomplished according to the present invention by providing an air filtration and control system for an animal housing comprising a blower unit having a fan drawing air through an inlet port with an air filter and exhausting at least a portion of said air into a plenum chamber surrounding said fan; a bedding unit providing an animal receiving surface disposed adjacent said blower unit, wherein said blower unit draws air across said animal receiving surface through said inlet port; said bedding unit including a frame having an interior air channel coupled in fluid communication with said plenum chamber of said blower unit for channeling air from said blower unit through said frame; and, said frame including at least one front exhaust port directing airflow back toward said blower unit.

In a further advantageous embodiment, a mesh sheet is carried by said frame to provide said animal receiving surface, wherein said mesh sheet allows for vertical airflow through said bedding unit.

In a further advantageous embodiment, a bedding topper is disposed on said mesh sheet of said animal receiving surface, wherein said topper includes a plurality of slits for allowing vertical airflow through said topper and said mesh sheet.

In a further advantageous embodiment, said bedding unit includes a front cross frame member disposed at a far end of said bedding unit away from said blower unit, said at least one exhaust port is included in said front cross frame member directing airflow back toward said blower unit underneath said bedding unit.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
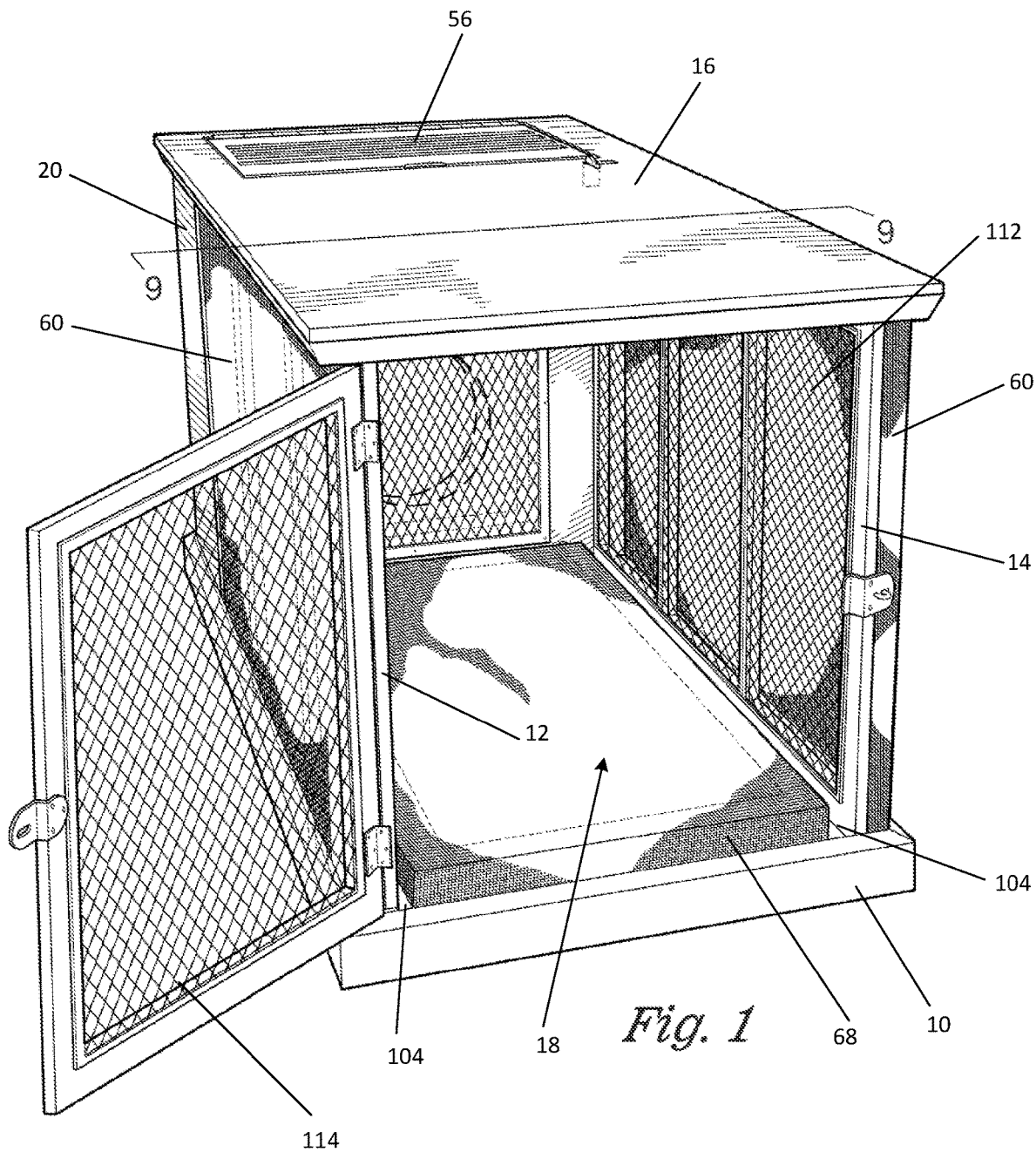
FIG. 1 shows a front left side perspective view of an animal housing having an air filtration and control system according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below. Such objects, features, benefits and advantages will be apparent from the above in conjunction with the accompanying examples, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Referring to FIGS. 1, 2, 4 and 9, an embodiment is shown of an animal housing with an air filtration and control system according to the present invention. In the illustrated embodiment, a base 10 is provided that carries a left-side panel 12 and a right-side panel 14. The side panels are further connected to a top panel 16 disposed on top of and extending between side panels 12 and 14. Accordingly, in this embodiment, base 10, side panels 12 and 14, and top panel 16 generally define a pet receiving area, designated generally as 18. The walls and frame members that define pet receiving area 18 can alternatively comprise any supporting frame arrangement essentially defining an interior space with a plurality of sides. It is also conceivable that a dome or other rounded shape can be utilized in practicing the present invention, as well as, a traditional wire frame cage.

A blower unit, designated generally as 20, is disposed at a rear side of pet receiving area 18. In the illustrated embodiment, blower unit 20 is carried on base 10 and arranged to abut left and right side panels 12 and 14, and is covered by top panel 16. Blower unit 20 draws air in a direction from a front side to a rear side of the housing across pet receiving area 18.

Figure 11:
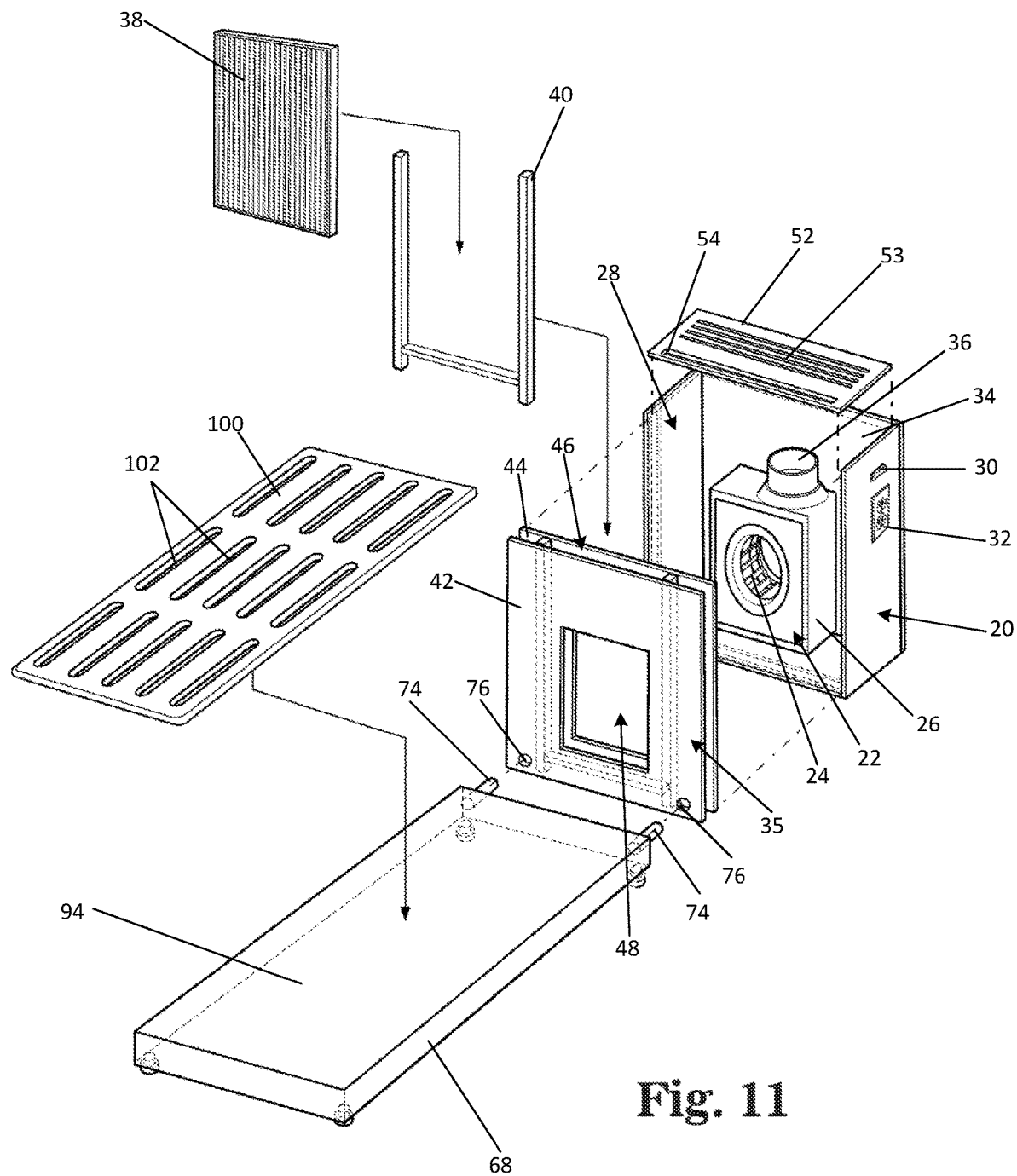
FIG. 11 shows an exploded view of the blower unit and bedding unit according to the present invention.

With further reference to FIG. 11, blower unit 20 further includes a fan sub-assembly, designated generally as 22, having an electric powered fan 24 in a fan housing 26. The fan sub-assembly 22 is carried in a plenum chamber 28 defined by exterior walls 34 and front wall assembly 35 of blower unit 20. In the illustrated embodiment, fan housing 26 is mounted to front wall assembly 35 adjacent inlet port 48 and draws air through the animal housing and into fan housing 26 through inlet port 48. Fan housing 26 further includes an exhaust port 36 for channeling the air out of fan housing 26 and into plenum chamber 28. A power switch 30 and electrical connector port 32 are disposed on the exterior of blower unit 20 and operatively associated with fan sub-assembly 22.

Figure 9:
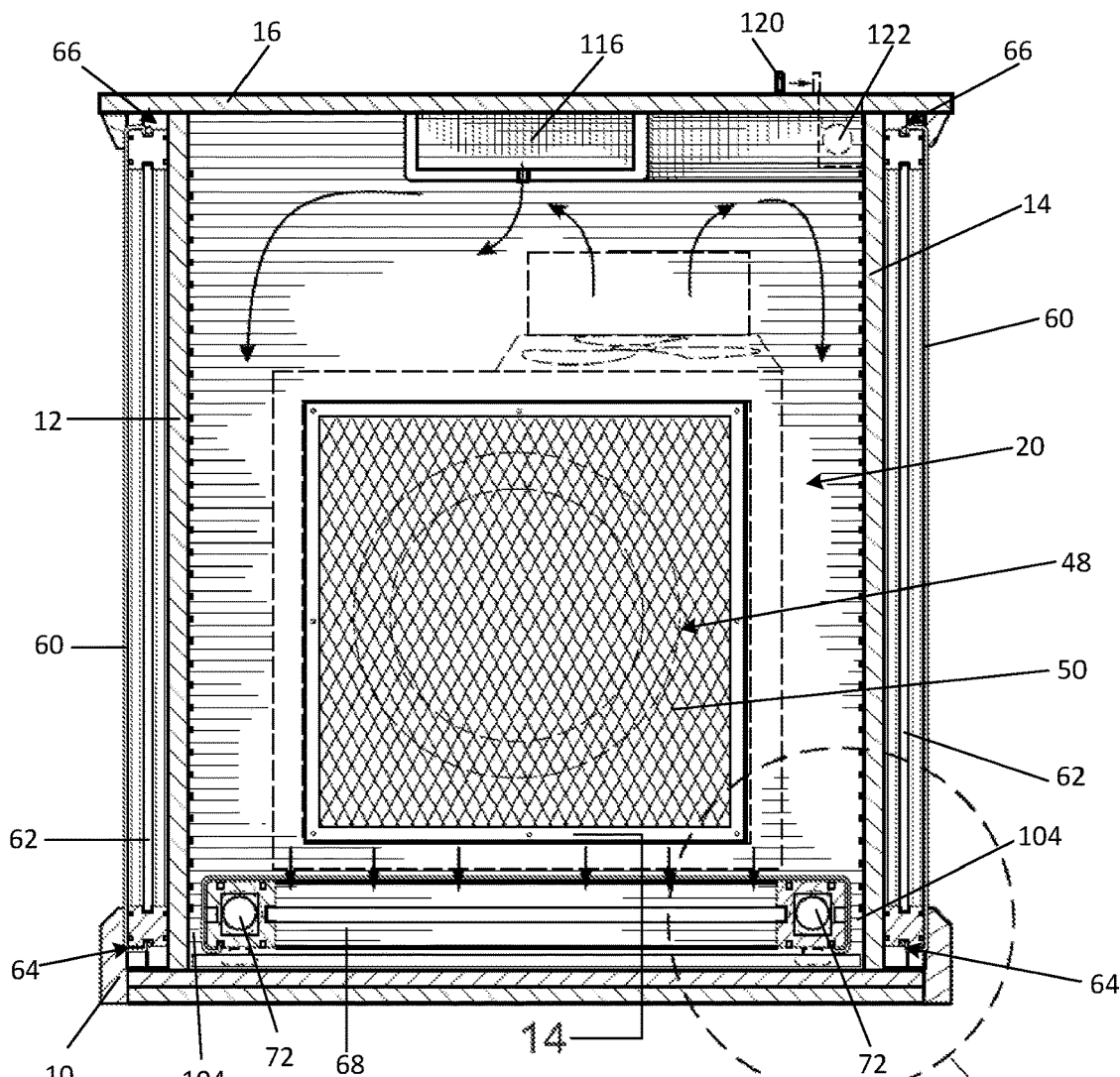
FIG. 9 shows a front cross-section view 9-9 from FIG. 1 of the animal housing with the air filtration and control system according to the present invention.
Figure 10:
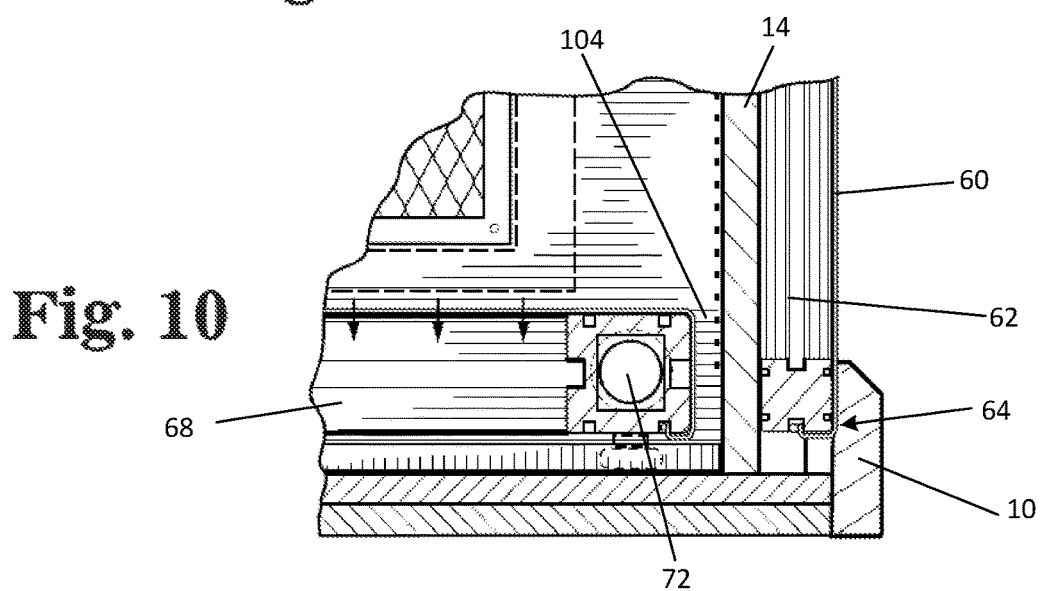
FIG. 10 shows a detailed cross-section view of portion 10 from FIG. 9 of the animal housing with the air filtration and control system according to the present invention.

An air filter 38 is carried in inlet port 48 of front wall assembly 35 of blower unit 20. Front wall assembly 35 includes a filter frame 40 secured between a first wall 42 and a second wall 44 so that a filter gap 46 is formed between first and second walls 42 and 44 for receiving a predetermined filter size. In the illustrated embodiment, air filter 38 is seated in filter gap 46 by filter frame 40 so that air filter 38 is disposed in inlet port 48. Accordingly, air filter 38 is positioned between fan sub-assembly 22 and pet receiving area 18 for filtering air being drawn through the animal housing. With further reference to FIG. 9, to resist damage to air filter 38, a protection screen 50 is carried on front wall assembly 35 in front of air filter 38.

Figure 2:
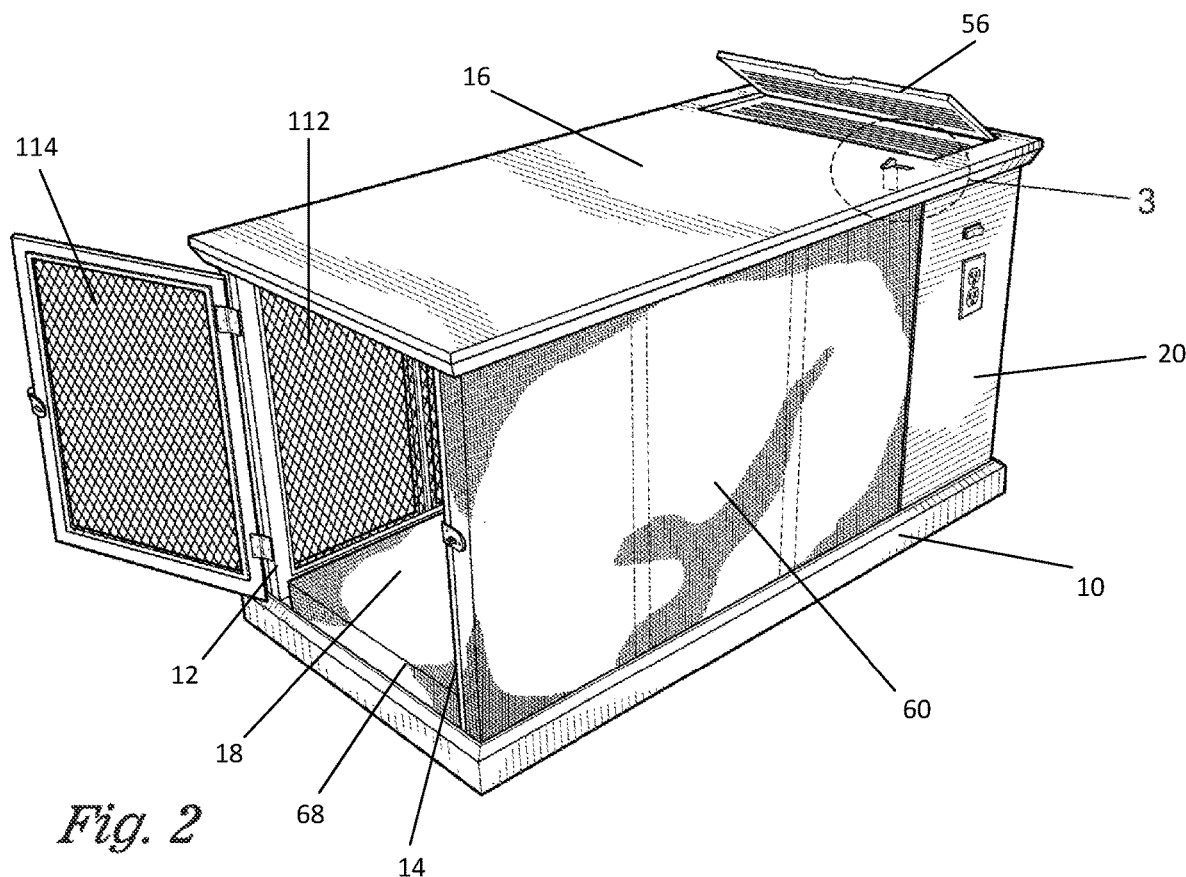
FIG. 2 shows a front right side perspective view of the animal housing with the air filtration and control system according to the present invention.
Figure 7:
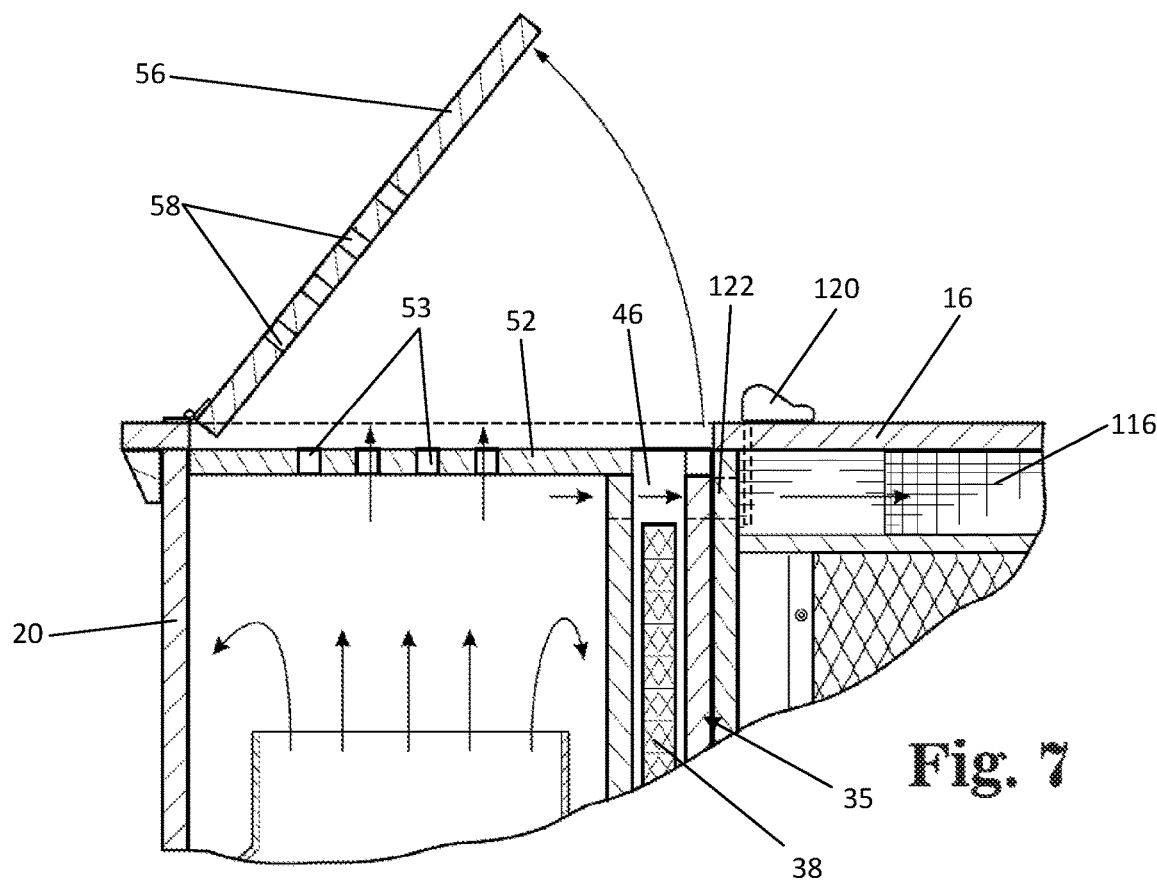
FIG. 7 shows a detailed cross-section view of portion 7 from FIG. 6 of the animal housing with the air filtration and control system according to the present invention.

Referring to FIGS. 2, 7, and 11, blower unit 20 includes a ventilated top wall 52 having a series of vent opening 53 for exhausting a portion of the air received into plenum chamber 28 to prevent over pressurizing plenum chamber 28. Top wall 52 also includes a filter slot 54 through which air filter 38 can be inserted into or removed from filter gap 46. To facilitate changing of air filter 38, top panel 16 includes ventilated access panel 56 pivotally carried in top panel 16. Ventilated access panel 56 also includes a series of vent opening 58 generally disposed above vent opening 53 in top wall 52 of blower unit 20 so that air exhausted from blower unit 20 can pass through top panel 16.

In one embodiment fan 24 comprises a centrifugal fan design, or alternatively, a backward curved blade design. Depending on the size of space to be filtered, the CFM could change. Most animal housing for pets would be in a range of 80 to 220 CFM, though larger housing may require use of a 220 to 2000 CFM fan design. The noise level is preferably between about 20 to 60 db to be pleasant for the animal. In the illustrated embodiment, fan 24 is a centrifugal fan with 165 CFM rating. The fan size is 4" deep and 9" diameter, this can be smaller or larger depending on RPM of the fan and how quiet it operates.

The pet will want to lay, sleep, near air filter 38 as it has a constant airflow. This increases the chance hair/dander is immediately pulled into air filter 38. Blower unit 22 has a low decibel ("db") operation so that the animal housing is a peaceful space for the pet to rest and sleep. Preferably the db level is around 20 db, but depending on the size of the housing and the fan, could be as load as around 60 db. In the illustrated embodiment, fan sub-assembly 22 operates around 36 db.

Air filter 38 may comprise a broad range of filter types constructed and arranged to capture large and small particulates, carbon for smells, and even MERV and HEPA, as desired or needed. Air filter 38 may also comprise an arrangement of multiple stacked filters, each of which could be the same or intended to filter a given target. For example, a first filter may be utilized to capture large debris, such as hair, while a second filter is utilized to capture dander and filter smells.

Referring to FIGS. 1, 2 and 9, an airflow control covering 60 is disposed on both left-side panel 12 and right-side panel 14, which creates a reduced airflow entering pet receiving area 18 through the side panel relative to the front side of the housing where the animal enters. By restricting the flow of air around the sides and top of the housing, a negative air pressure is established within the housing in the pet receiving area while providing a primary airflow direction from the front side to the rear side of the housing to contain pet hair, dander and debris within the housing.

In the illustrated embodiment, airflow control covering 60 comprises a mesh sheet disposed over the left-side panel 12 and said right-side panel 14. As best shown in FIG. 9, airflow control covering 60 is carried by a cover frame 62. Cover frame 62 is removably carried in a lower channel 64 in base 10 and in an upper channel 66 in top panel 16. Accordingly, removal of top panel 16 allows the cover frame 62 to be raised out of lower channel 64 for removing airflow control covering 60. This may be required for periodic cleaning or replacement, such as to change the color of the mesh to match a particular decor.

Figure 5:
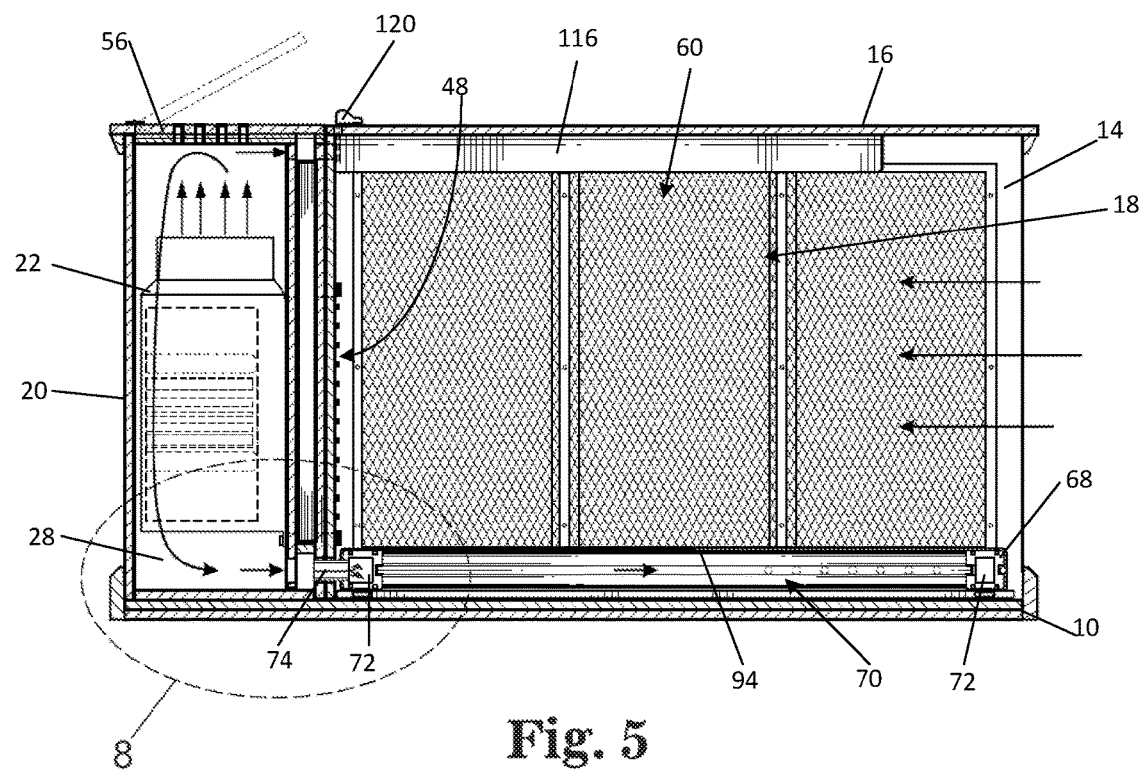
FIG. 5 shows a cross-section view 5-5 from FIG. 4 of the animal housing with the air filtration and control system according to the present invention.
Figure 6:
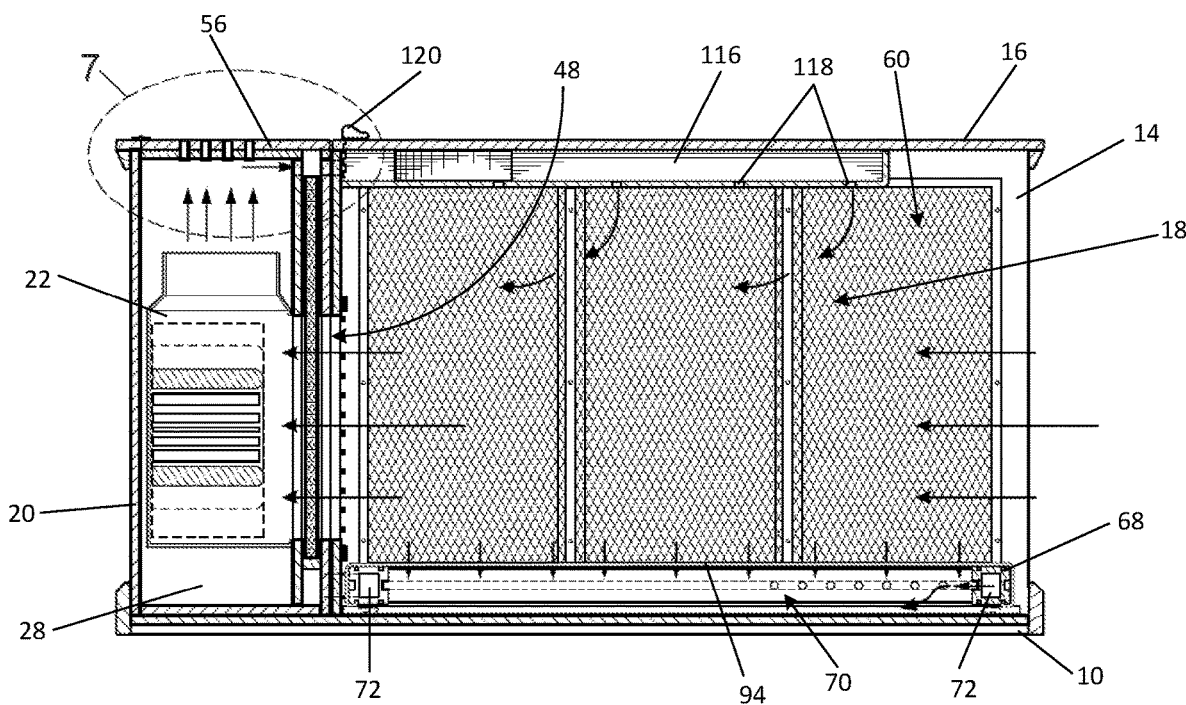
FIG. 6 shows a cross-section view 6-6 from FIG. 4 of the animal housing with the air filtration and control system according to the present invention.

Preferably, airflow control covering 60 is disposed over the entire left-side panel 12 and the entire right-side panel 14 to provide a reduced airflow entering the left and right sides of the animal housing relative to a front side of the animal housing where the pet enters. In a further embodiment, airflow control covering 60 can be used in place of a solid top panel 16. Airflow control covering 60 can also be used to cover any portion of the rear side of the housing adjacent blower unit 20 that is not covered to avoid unwanted uncontrolled airflow in and out of the animal housing. As best shown in FIGS. 2, 5 and 6, blower unit 20 is constructed and arranged to cover or enclose the entire rear side 22 of the animal housing to avoid unwanted airflow around the sides blower unit 20. Front side 20 is left open or at least partially open to produce a higher airflow from the front to the rear as blower unit 20 draws through the animal housing. Accordingly, the negative air pressure established on all sides of the housing helps draw all dander and most pet air to the air filter 38.

In an alternative arrangement, blower unit 20 can be mounted to a support frame such as a traditional wire frame cage. In this arrangement, the blower unit 20 would be mounted to one of the sides, such as a rear side opposite the cage opening. The top side, left and right sides can then optionally be covered with the airflow control covering mesh according to the present invention, as well as any open areas on the rear side carrying blower unit 20 to control airflow through the cage and create a negative air pressure in the interior pet receiving area. In a further alternative arrangement, blower unit 20 can be mounted to a side other than the rear, since some crates have an optional entrance or door on the side. This allows for more flexible entry, while still being able to control airflow within the animal housing. Often the larger spaces/kennels will use the side door. Regardless, airflow control cover 60 allows limited airflow from the sides, top and rear as desired, increasing the negative pressure to be greater at the entrance of the space on whichever side that may be.

There is limited air coming through the mesh sheet sides depending on the closure amount of the material used. This will prevent the dander/hair/fur from being caught on the inside of the space directing air to the filter. Airflow control cover 60 gives an attractive look to the pet housing. Many colors are available. In addition, the opening sizes of the mesh can vary from 40% to 100% closed airflow but even the 100% closed must still be breathable. The size closure differences in the material are used to control the airflow. Larger spaces will require 90%-100% closure though the sides and top of the space. Smaller crates may have a more open screen-filter 40%-90%. This allows the system to operate with less CFM and quieter operation by controlling airflow.

Dog hair is the primary collection problem with dogs. Dander is light weight and easily brought into a filter with the negative air pressure and airflow direction of the present invention. The mesh sheets that define air control covering 60 of the present invention allowing air to pass thru but do not let the hair escape the area. This is due to physically blocking the hair from escaping, as well as the effects of negative air pressure within the housing. In one embodiment, the mesh sheets that define the airflow control cover 60 are a hurricane rated screen to provide durability in the animal housing. However, airflow control cover 60 may comprise any breathable fabric capable of allowing airflow into the housing. Preferably, airflow control cover 60 comprises a woven fabric mesh using 0.018" diameter vinyl coated 500 denier polyester core yarns in the warp and in the fill. This material is sufficiently durable to resist the weight, scratching, and biting of the largest dogs.

Referring to FIGS. 1, 5 and 6, a bedding unit 68 is disposed in pet receiving area 18. Bedding unit 68 is adapted to receive and channel air from blower unit 20 at the rear of the animal housing back toward the front side of the animal housing, at which point the air is exhausted and directed back toward blower unit 20 underneath bedding unit 68.

With further referring to FIGS. 8, 12-17, bedding unit 68 includes a frame 70 having an interior air channel 72 adapted for engaging in fluid communication with plenum chamber 28 of blower unit 20 for channeling air from blower unit 20 through frame 70. In the illustrated embodiment, a pair of inlet connector tubes 74 extend from a rear cross frame member 71 of frame 70 and are received in openings 76 (FIGS. 8, 11) in front wall assembly 35 of blower unit 20. Inlet connector tubes 74 provide a continuous air channel between frame 70 and plenum chamber 28.

In the illustrated embodiment, frame 70 includes a pair of front exhaust ports 78 disposed in a front cross frame member 80 of frame 70. Front cross frame member 80 is disposed at a far end of bedding unit 68 opposite inlet connector tubes 74 away from blower unit 20 with front exhaust ports 78 arranged for directing airflow back toward blower unit 20. Additionally, frame 70 includes a series of side exhaust ports 82 disposed in a left cross frame member 84 and a right cross frame member 86 for exhausting air underneath said bedding unit. The side exhaust ports help direct the flow of air exiting front exhaust ports 78 to channel the airflow back toward blower unit 20 underneath bedding unit 68.

Footing member 88 is carried on bottom side of each corner of bedding unit 68 to raise frame 70 off of base 10 to allow air to flow underneath. Accordingly, an airflow gap 90 (FIG. 8) is provided underneath bedding unit 68. Additionally, an air flow gap 92 (FIG. 8) is provided between rear cross frame member 71 and front wall assembly 35 of blower unit 20 to allow air to flow upward from underneath bedding unit 68 and back into blower unit 20 where the air is filtered and recirculated through the system.

In the illustrated embodiment, a mesh sheet 94 is carried by frame 70 and suspended above base 10 to define an animal receiving surface on which the pet can rest. Mesh sheet 94 allows for vertical airflow, primarily in a downward direction, through bedding unit 68. In one embodiment, mesh sheet 94 is the same material as airflow control covering 60. This provides an animal receiving surface that is easy to clean compared to conventional bedding. Debris can simply be wiped or sprayed off the mesh. To attach mesh sheet 94 to frame 70, securing channels 96 are disposed in frame 70. A spline 98 wedges mesh sheet 94 into one or more of securing channels 96 for affixing mesh sheet 94 to frame 70.

Referring to FIG. 11, a bedding topper 100 may be disposed on top of mesh sheet 94 of bedding unit 68. In the illustrated embodiment, topper 100 includes a plurality of slits 102 for allowing vertical airflow through topper 100 and mesh sheet 94. Bedding topper 100 may be made of a durable foam or rubber material, or other suitable material for an animal bedding surface.

Referring to FIGS. 1, 4, 9 and 10, in the illustrated embodiment, a debris collection gap 104 is disposed between bedding unit 68 and left-side panel 12 and right-side panel 14. Debris collection gap 104 allows larger hair and debris items that cannot be drawn into air filter 38 to be pushed off bedding unit 68 and drop below for collection.

Figure 8:
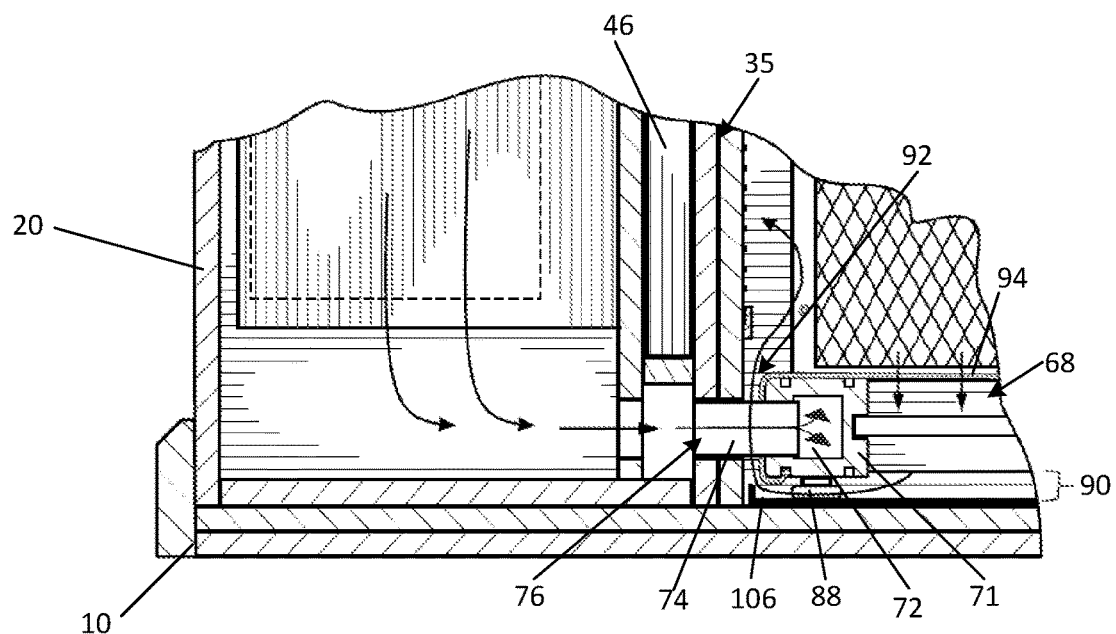
FIG. 8 shows a detailed cross-section view of portion 8 from FIG. 5 of the animal housing with the air filtration and control system according to the present invention.
Figure 18:
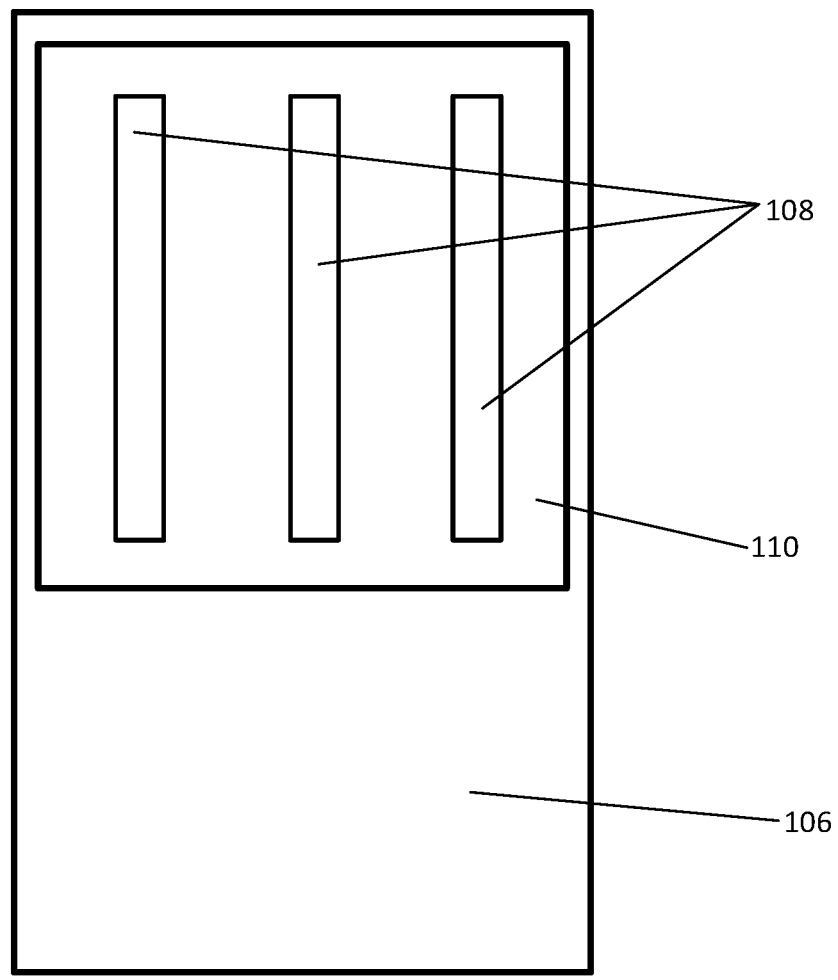

Referring to FIGS. 8 and 18, in the illustrated embodiment, a tray 106 is disposed on base 10 beneath bedding unit 68 and debris collection gap 104 for receiving debris that falls through debris collection gap 104 as well as mesh sheet 94. Preferably, tray 106 includes at least one adhesive strip 108 for trapping debris in tray 106. In the illustrated embodiment, adhesive strip 108 is disposed on a sheet 110 that can be placed on tray 106 and easily removed and replaced.

Referring to FIGS. 1 and 2, in the illustrated embodiment, a grate 112 is disposed on an interior side of each side panel 12 and 14 to help protect airflow control covering 60. Dogs can also rub against grate 112 to remove fur, which is then contained in the animal housing.

Additionally, a front door panel 114 may be pivotally mounted to one of left-side panel 12 and right-side panel 14, wherein front door panel 114 comprises a grate providing generally unrestricted airflow through front door panel 114 relative to airflow control covering 60 disposed side panels 12 and 14.

Figure 3:
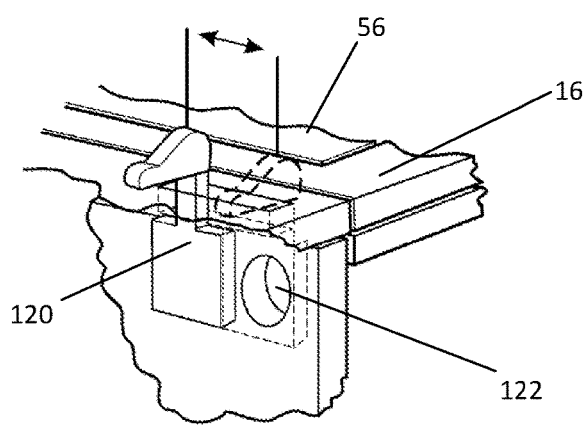
FIG. 3 shows a detailed cut-away view of the control valve from the indicated portion 3 in FIG. 2 according to the present invention.
Figure 4:
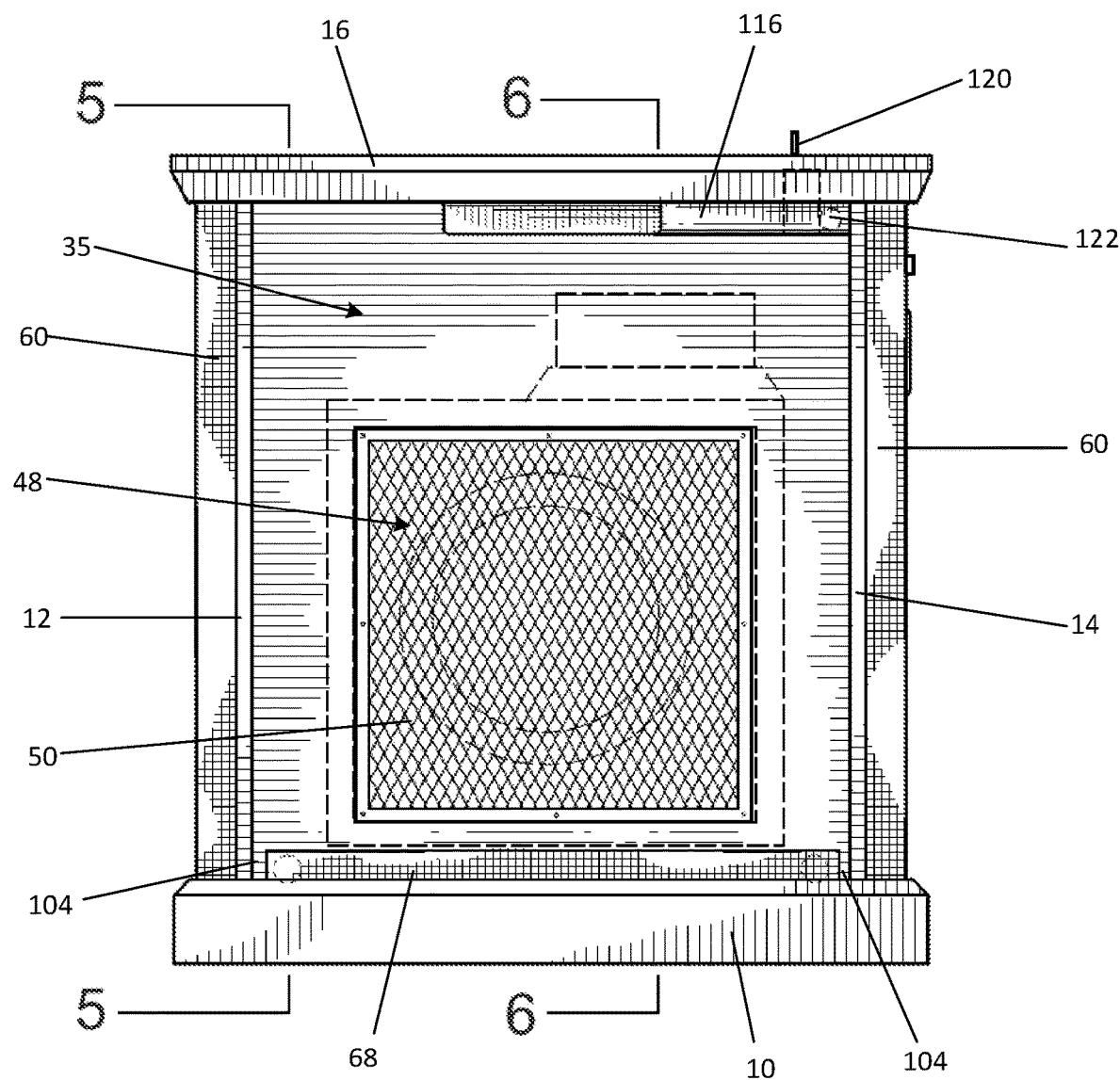
FIG. 4 shows a front elevation view of the animal housing with the air filtration and control system according to the present invention.

Referring to FIGS. 4-7 and 9, in the illustrated embodiment, an upper air channel 116 is carried by top panel 16. Upper air channel 116 is adapted for engaging in fluid communication with plenum chamber 28 of blower unit 20 for channeling air from blower unit 20 through upper air channel 116. Upper air channel 116 includes a series of exhaust ports 118 for blowing air downward into pet receiving area 18. With further reference to FIG. 3, a control valve 120 is operatively associated with upper air channel 116 for selectively allowing air to enter upper air channel 116 through an inlet port 122 extending between plenum chamber 28 and upper air channel 116. By sliding control valve 120 left or right, inlet port is either blocked or opened to upper air channel 116.

Referring to FIGS. 5 and 6, blower unit 20 draws air across pet receiving area 18 from a front to a rear of the animal housing, as well as through side panels 12 and 14. The airflow through side panels 12 and 14 is restricted by airflow control covering 60 to establish a primary direction of airflow from a front to a read of the animal housing. The air is then drawn into inlet port 48 and exhausted from fan-subassembly 22 into plenum chamber 28. From plenum chamber 28, airflow is selectively channeled in upper air channel 116 where it is exhausted downward into pet receiving area 18 and recirculated. Also, airflow is directed into interior air channel 72 of frame 70 of bedding unit 68 where it is channeled to a front of bedding unit 68 disposed at a front of the animal housing. The air is then exhausted underneath bedding unit 68 and directed back toward blower unit 22. Air is also drawn downward through mesh sheet 94 of bedding unit 68 into the airflow gap underneath bedding unit 68. The airflow underneath bedding unit 68 is then drawn back into inlet port 48 of blower unit 20 where the air is filtered and recirculated. Accordingly, a negative air pressure is established on all sides of the animal housing helps draw all dander and most pet air to the air filter 38.

Figure 12:
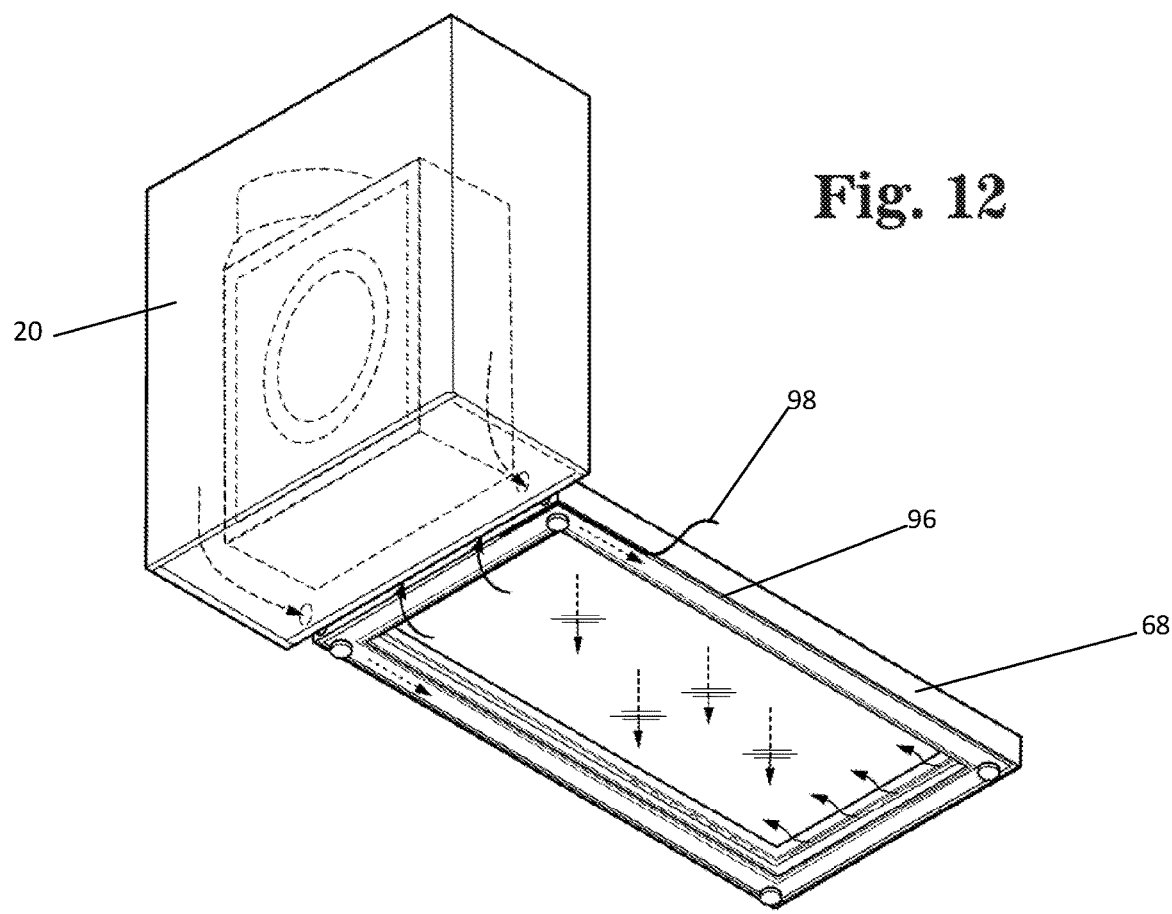
FIG. 12 shows bottom perspective view of the blower unit and bedding unit according to the present invention.
Figure 13:
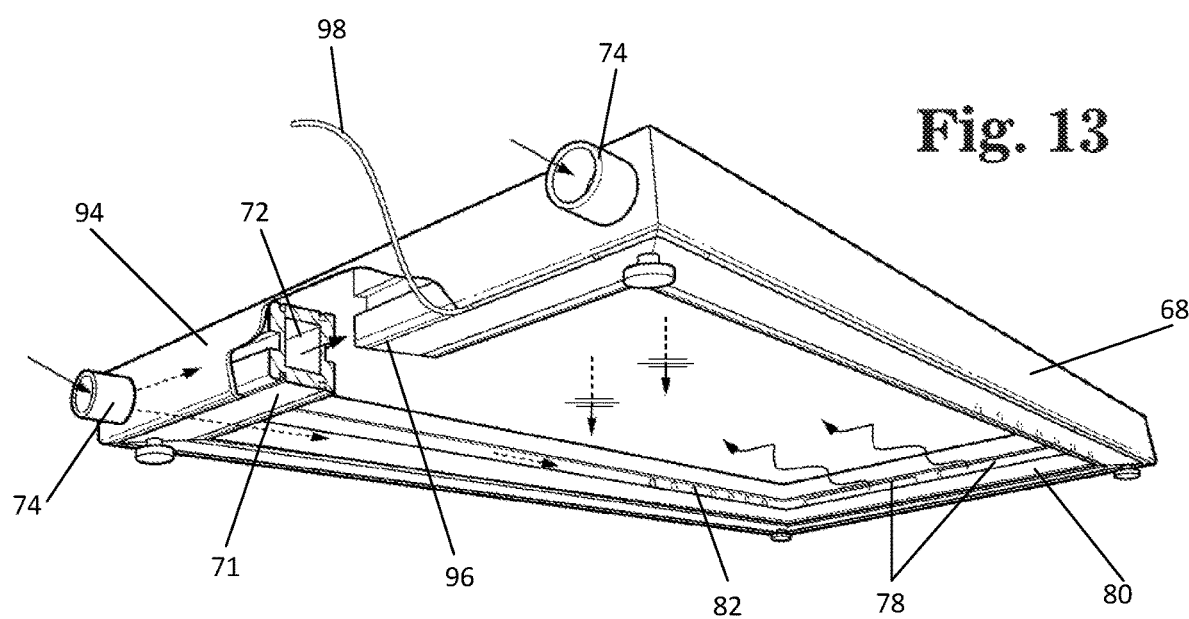
FIG. 13 shows a bottom perspective view and partial cut-away of the bedding unit according to the present invention.
Figure 14:
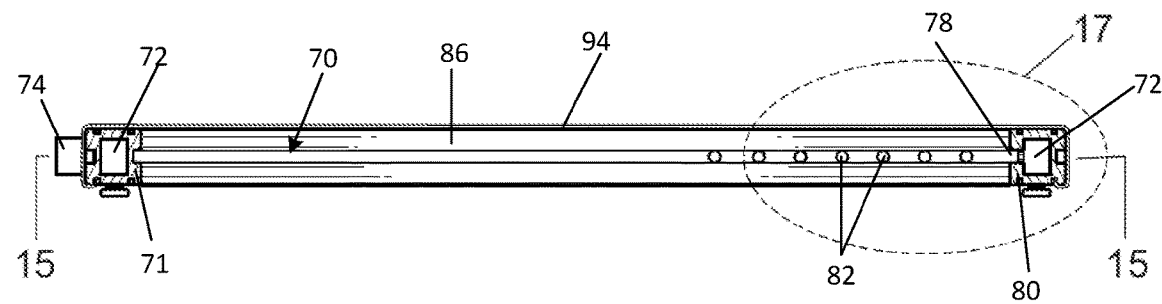
FIG. 14 shows a cross-section view 14-14 from FIG. 15 of the bedding unit according to the present invention.
Figure 15:
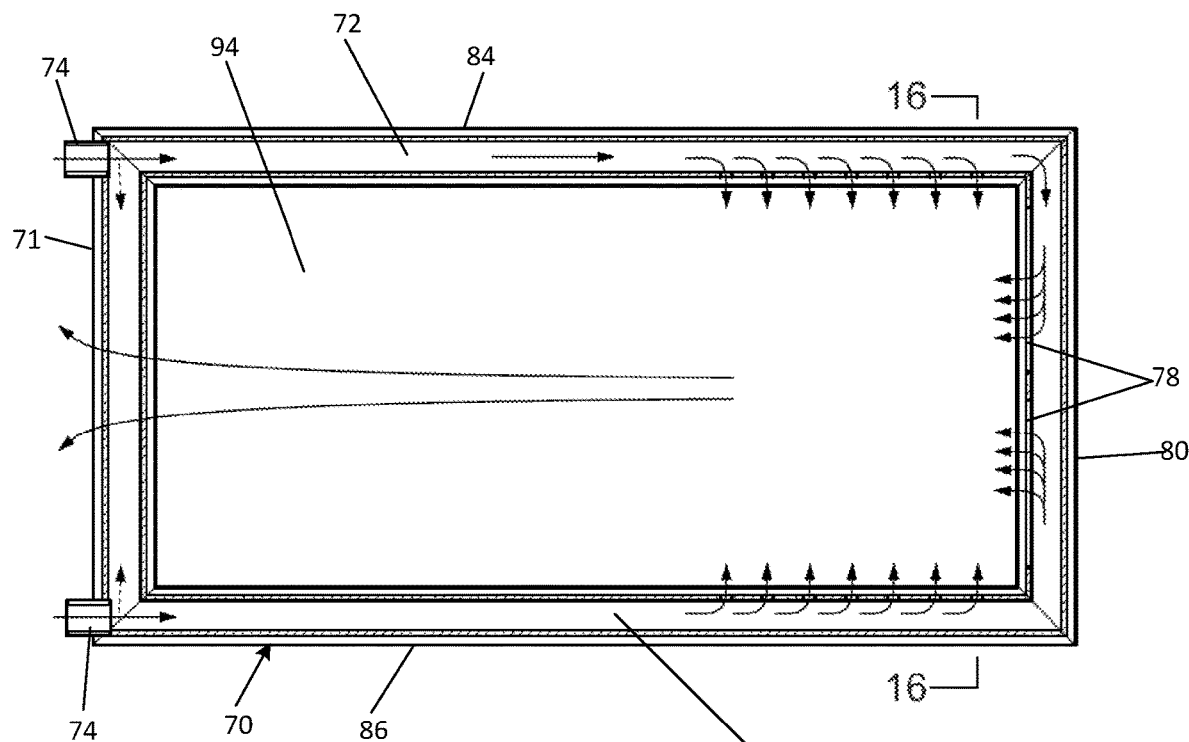
FIG. 15 shows a bottom view of the bedding unit according to the present invention.
Figure 16:
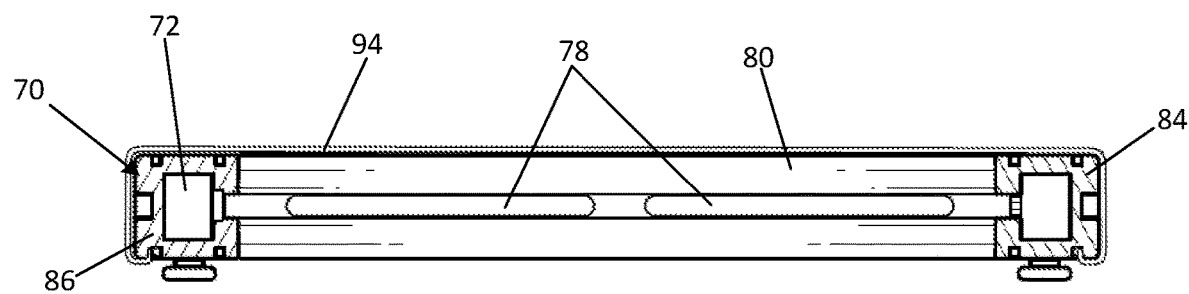
FIG. 16 shows a cross-section view 16-16 from FIG. 15 of the bedding unit according to the present invention.
Figure 17:
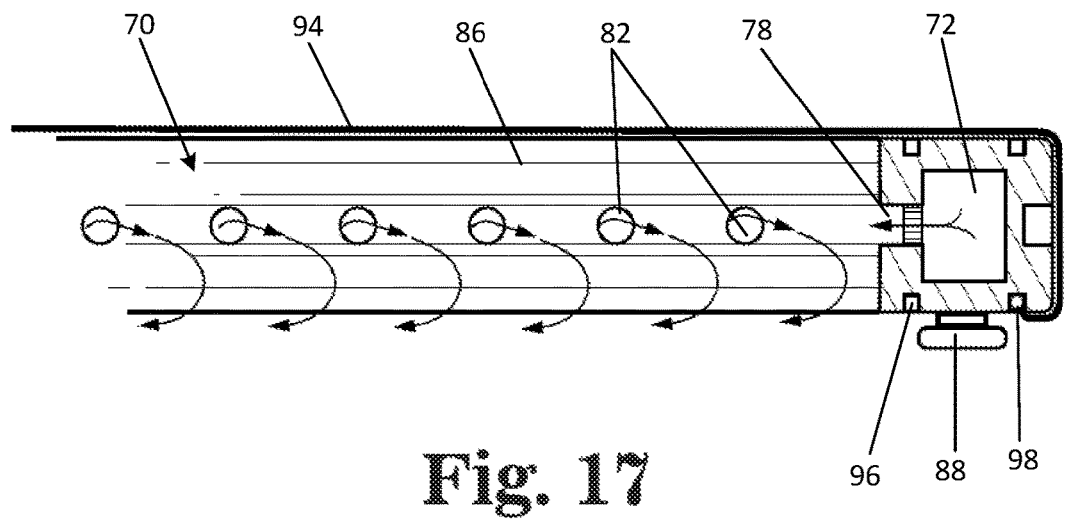
FIG. 17 shows a detailed cross-section view of portion 17 from FIG. 14 of the bedding unit according to the present invention; and, FIG. 18 shows a top plan view of a debris collection insert carried by the tray according to the present invention.

Referring to FIGS. 11 and 12, preferably, blower unit 20 is releasably carried by base 10 so that it is easily portable, can be adapted to attach to other crates and cages, but can be also be used on a stand, (standalone) for filtering specific areas. Blower unit 20 can even be operated in a vehicle. If traveling, the user can convert power to DC and filter the pet space while driving, reducing pet hair all over the vehicle. Blower unit 20 and bedding unit 68 can be used independent of any housing and still provide air filtration and airflow control around bedding unit 68 for drawing fur and dander into air filter 38.

The animal housing of the present invention stops pet hair from traveling through the house, building, vehicle, plane, boat, camper, etc. The airflow control cover 60 limits the airflow on the crate to direct air from the front to the rear, and also limits the hair, fur, and dander from leaving the space. The air (primarily) enters the front area with or without a door, which forces all of the air to travel by the dog therefore carrying the dirt, hair, dander directly to the filter. Other debris drops into the collection tray below.

This filter system not only filters the air directly from the pet but will filter the air in the entire room. This is useful because it pulls the air directly from the pet and does not allow this dander/hair to travel throughout the house to other surfaces, lamp shades, etc. because it is processed immediately at the source.

The animal housing of the present invention will gather most of the hair and dander. Some pets have fine hair and most of that hair is brought into the filter. Some pets have heavier hair and much of this will fall through the bedding unit 68 or debris collection gaps 104 to the bottom tray 106. Virtually all the hair and dander stays within the housing. Since the airflow is from the front of the space, most of the hair-dander goes in the air filter 38 and is trapped. The rest is contained by the side mesh sheets and falls to bottom tray 106. In certain embodiment, it may be preferred to cover the bottom side of the housing with airflow control cover 30 to contain any hair that may not be pulled into the filter or escapes tray 106.

The system of the present invention prevents daily vacuuming around areas in which the pet sleeps. The bottom tray 106 can be removed and cleaned as needed. Air filter 38 can be cleaned or replaced as needed.

The invention thus cleans the pet hair, at its source, provides a comfortable space that encourages resting. The suspended mesh sheet 94 of the bedding unit 68 can help clean pet's feet after a walk or being outside and help dry the pet after washing, reduce washing dog beds.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:
1. An air filtration and control system for an animal housing, comprising:
    a base carrying a left-side panel and a right-side panel;
    a top panel disposed on and extending between said side panels, wherein said base, said side panels and top panel define a pet receiving area;

a blower unit disposed at a rear side of said pet receiving area drawing air in a direction from a front side to said rear side of the housing across the pet receiving area; and, an airflow control covering disposed on at least one of said left-side panel and said right-side panel providing a reduced airflow entering said pet receiving area through the side panel relative to a front side of the housing, wherein a negative air pressure is established within the housing while providing a primary airflow direction from said front side to said rear side of the housing to container pet hair, dander and debris within said housing.

2. The system of claim 1 including a bedding unit disposed in said pet receiving area adapted to receive and channel air from said blower unit at said rear of said housing back toward said front side of said housing wherein said air is exhausted and directed back toward said blower unit underneath said bedding unit.

3. The system of claim 2 wherein said bedding unit including a frame having an interior air channel adapted for engaging in fluid communication with a plenum chamber of said blower unit for channeling air from said blower unit through said frame.

4. The system of claim 3 wherein said frame includes at least one front exhaust port disposed in a front cross frame member disposed at a far end of said bedding unit away from said blower unit for directing airflow back toward said blower unit.

5. The system of claim 3 wherein said frame includes at least one exhaust port disposed in a left cross frame member and a right cross frame member for exhausting air underneath said bedding unit.

6. The system of claim 3 wherein a mesh sheet is carried by said frame and suspended over said base to define an animal receiving surface, wherein said mesh sheet allows for vertical airflow through said bedding unit.

7. The system of claim 2 at least one debris collection gap disposed between said bedding unit and at least one of said left-side panel and said right-side panel.

8. The system of claim 7 including a tray disposed beneath said bedding unit and said debris collection gap for receiving debris that falls through said debris collection gap.

9. The system of claim 8 wherein said tray includes at least one adhesive strip for trapping debris in said tray.

10. The system of claim 1 wherein said airflow control covering comprises a mesh sheet disposed over at least a portion of one of said left-side panel and said right-side panel.

11. The system of claim 1 including a grate disposed on an interior side of at least one of said left-side panel and said right-side panel.

12. The system of claim 1 including a front door panel pivotally mounted to one of said left-side panel and said right-side panel, wherein said front door panel comprises a grate providing generally unrestricted airflow through said front door panel relative to said airflow control covering disposed on at least one of said left-side panel and said right-side panel.

13. The system of claim 1 wherein said blower unit includes an air filter disposed between a fan and said pet receiving area for filtering air being drawn through the housing.

14. The system of claim 1 wherein said airflow control covering includes a cover frame removably carried in a lower channel in said base and in an upper channel in said top panel, wherein removal of said top panel allows said cover frame to be raised out of said lower channel for removing said airflow control covering.

15. The system of claim 1 including an upper air channel carried by said top panel, wherein said upper air channel is adapted for engaging in fluid communication with said plenum chamber of said blower unit for channeling air from said blower unit through said upper air channel, and wherein said upper air channel includes at least one exhaust port for blowing air into said pet receiving area.

16. The system of claim 1 including a control valve operatively associated with said upper air channel for selectively allowing air to enter said upper air channel from said plenum chamber.

17. An air filtration and control system for an animal housing, comprising:
a blower unit having a fan drawing air through an inlet port with an air filter and exhausting at least a portion of said air into a plenum chamber surrounding said fan;
a bedding unit providing an animal receiving surface disposed adjacent said blower unit, wherein said blower unit draws air across said animal receiving surface through said inlet port;
said bedding unit including a frame having an interior air channel coupled in fluid communication with said plenum chamber of said blower unit for channeling air from said blower unit through said frame; and,
said frame including at least one front exhaust port directing airflow back toward said blower unit.

18. The system of claim 17 wherein a mesh sheet is carried by said frame to provide said animal receiving surface, wherein said mesh sheet allows for vertical airflow through said bedding unit.

19. The system of claim 18 including a bedding topper disposed on said mesh sheet of said animal receiving surface, wherein said topper includes a plurality of slits for allowing vertical airflow through said topper and said mesh sheet.

20. The system of claim 17 wherein said bedding unit includes a front cross frame member disposed at a far end of said bedding unit away from said blower unit, said at least one exhaust port is included in said front cross frame member directing airflow back toward said blower unit underneath said bedding unit.

* * * * *